Sept. 22, 1953     R. C. ALLEN ET AL     2,653,310
GAIN MEASURING DEVICE
Filed Dec. 10, 1945
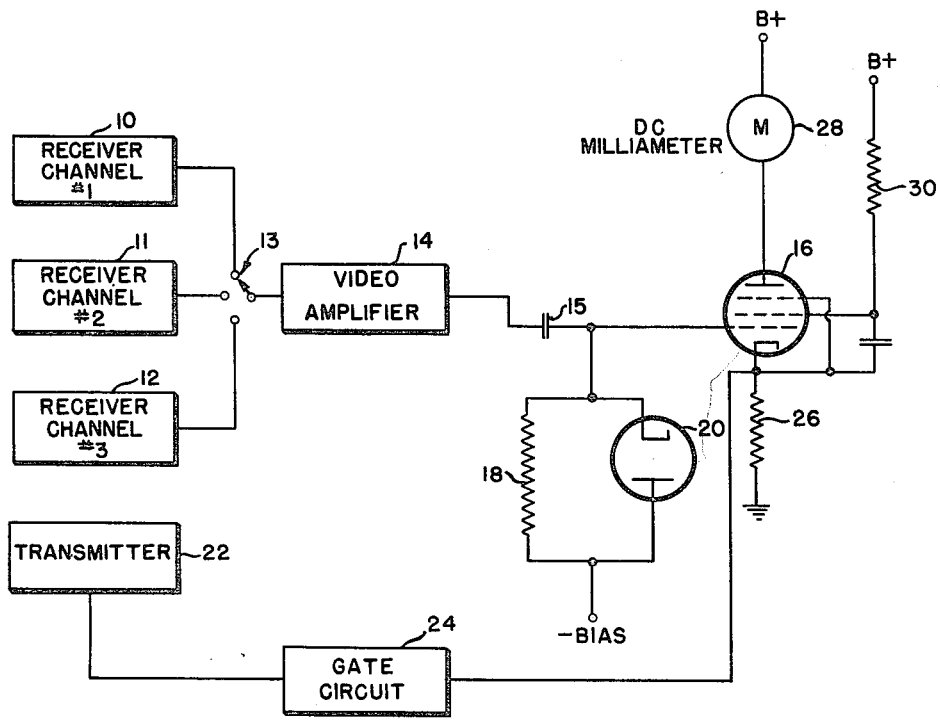
INVENTORS
RICHARD C. ALLEN
JACOB MILLMAN
BY
*William D. Hall.*
ATTORNEY Patented Sept. 22, 1953

2,653,310

UNITED STATES PATENT OFFICE 2,653,310

GAIN MEASURING DEVICE

Richard C. Allen, Carthage, Mo., and Jacob Millman, Brookline, Mass., assignors, by direct and mesne assignments, to the United States of America as represented by the Secretary of War Application December 10, 1945, Serial No. 634,072

4 Claims. (Cl. 343—5)

This invention relates generally to electrical circuits and more particularly to a gain comparison circuit for a multiple-channel radio receiving system.

In one type of radio object locating system a series of pulses of R.-F. energy is transmitted by one or more directive antennas, and echo pulses are received and applied to an indicating system in such a manner as to determine the position of the reflecting object which causes them. In such a system interference is often obtained from trees, buildings, and other ground objects close to the transmitter which return echoes known as ground clutter. This ground clutter tends to obscure the indication of other objects at higher elevations but within the range to which ground clutter extends. To avoid interference from this source, and at the same time to retain sensitivity for echoes from low lying objects beyond the range of ground clutter, some systems employ a plurality of directive beams of R.-F. pulses lying one above the other in elevation but in the same vertical plane. Echoes from each of these beams are received, amplified, and detected in a separate receiver channel, and those lower channels which experience interference from ground clutter are blocked for the interval after each transmitted pulse during which echoes from ground objects are received. The remaining signals may be combined in various ways and presented on the indicator of the system.

Under some circumstances it may be desirable to present on the indicator only those echo signals obtained from the lower beam, or it may be desirable to present in rapid succession the echo signals obtained from various beam channels. For this type of operation the noise levels of the various receiver channels should be matched to maintain a uniform noise level on the indicator, and equal-intensity pulses entering through different receiver channels should give equal signals on the indicator.

It is, therefore, an object of the present invention to provide a novel means of comparing the respective gains of a plurality of radio receiver channels, so that these gains may be matched.

The invention generally contemplates isolating the echo pulses from the noise in the video output of each receiver channel and using the average level of this noise output as a criterion for adjusting the gain of each channel.

Other objects, features and advantages of this invention will suggest themselves to those skilled in the art and will become apparent from the following description of the invention taken in connection with the accompanying drawing in which the single figure is a diagrammatic representation of part of a system including one embodiment of the invention.

Reference is now made more particularly to the drawing, in which the video output of receiver channels 10, 11 and 12 may be selectively applied by means of selector switch 13 to video amplifier 14. It will be obvious that the number of receiver channels may be increased or decreased in accordance with requirements of the system to be used. Video amplifier 14 is so constructed that the pulses of its output are positive in polarity, and these pulses may be applied through a coupling capacitor 15 to the control grid of pentode 16. Pentode 16 is biased at cut-off by a negative potential applied to the control grid through the parallel combination of resistor 18 and diode 20, the cathode of the latter being connected to the control grid of the pentode.

A periodic voltage pulse, which coincides in time with the transmitted pulse of the radio object locating system under consideration, is applied from transmitter 22 to gate circuit 24. Gate circuit 24 consists of a multivibrator of the start-stop or one-shot type, requiring a trigger pulse for proper operation and producing a square wave output. The polarity of this square wave output is so chosen that the origin of the positive portion coincides in time with the input trigger. The duration of the positive portion of this square wave may be adjusted if desired by varying the bias on the grid of one of the vacuum tubes in the multivibrator circuit. The output of gate circuit 24 is applied to the cathode of pentode 16, which is connected through resistor 26 to ground. The plate of pentode 16 is connected to a source of positive potential, and a D.-C. milliammeter 28 is inserted in the plate circuit. The screen voltage for pentode 16 may be supplied either directly or through a dropping resistor 30 from the source of plate potential.

When the circuit of the drawing is being used for gain adjustment, video signals from video amplifier 14 are applied, as explained above, to the control grid of pentode 16, and since these signals are positive, they cause a flow of plate current in this vacuum tube. The parallel arrangement of resistor 18 and diode 20 acts as a clamper circuit to maintain the quiescent control grid potential of pentode 16 at the value determined by the magnitude of the negative bias voltage. If this arrangement were not used, the voltage on the control grid of pentode 16 would fluctuate between video pulses, and its value would depend upon the magnitude of this video input, due to the averaging effect of capacitor 15.

The video signal applied to the control grid of pentode 16 consists of both noise and echo pulses. Since the noise voltage alone is to be used as a measure of receiver gain, the positive square wave voltage from gate circuit 24 is applied to the cathode of pentode 16 and this voltage is of sufficient magnitude and duration to prevent pentode 16 from conducting current throughout the interval during which echo pulses are appreciable in magnitude. This square wave may be adjusted in duration as previously explained, so as to include all video echo pulses of appreciable amplitude which occur during the interval following the transmitted pulse.

Video echo pulses which occur after the termination of this positive square wave will be of small magnitude due to the large range of the objects which cause them, and will not add appreciably to the noise voltage. Thus, during the interval in which pentode 16 is not cut off by the positive gate voltage pulse, plate current will flow, and the average value of this plate current, as measured by D.-C. milliammeter 28, will be proportional to the level of the noise voltage. It can be seen that milliammeter 28 will average this plate current over the non-conducting as well as conducting period of pentode 16.

To adjust the respective gains of a series of receiving channels, the video outputs of these channels may be applied successively to video amplifier 14, and the gain of each channel may be adjusted until the noise level as indicated by D.-C. milliammeter 28 has attained a certain predetermined value. The desired value for the indication of milliammeter 28 will be determined by the desired level of background noise as it appears on the indicator of the object locating system.

While there has been described what is at present considered to be the preferred embodiment of this invention, it will be obvious to those skilled in the art that various changes and modifications may be made therein without departing from the scope of the invention as set forth in the appended claims.

The invention claimed is:

1. The combination including a plurality of radio receiving means, video amplifying means, means for selectively applying the outputs of said receiving means to said video amplifying means, a pentode detector, means for applying the output of said video amplifying means to the control grid of said pentode, clamping means for applying a bias voltage on the control grid of said pentode for effecting the cutoff thereof and maintaining said control grid at said bias voltage during quiescent periods of said pentode, a transmitter for radiating a series of periodic electromagnetic pulses and for producing a periodic trigger pulse coinciding with each of said electromagnetic pulses, a rectangular voltage generator for generating rectangular gate pulses, means for applying said trigger pulses to said rectangular voltage generator to initiate each gate pulse simultaneously with one of said trigger pulses, means for applying said gate pulses to said pentode to maintain said pentode far below cutoff for the duration of each gate pulse, and a meter in circuit with the output of said pentode for measuring the average value of the output of said pentode.

2. In combination, video amplifying means, a pentode detector, means for applying the outputs of said video amplifying means to the control grid of said pentode, clamping means for applying a bias voltage on the control grid of said pentode for effecting the cutoff thereof and maintaining said control grid at said bias voltage during quiescent periods of said pentode, means adapted to be connected to a source of trigger pulses for producing and applying to said pentode rectangular gate pulses each of which is initiated simultaneously with the occurrence of a trigger pulse to maintain said pentode far below cutoff for the duration of each gate pulse, and a meter in circuit with the output of said pentode for measuring the average value of the output of said pentode.

3. A gain measuring apparatus for use with a radio-object locating system having a pulse transmitter for transmitting radio pulses toward reflecting objects and a pulse receiver having discrete reception intervals for receiving echoes reflected from said reflecting objects, said apparatus being separate from said receiver and comprising rectifying means, means for applying the output of said receiver to said rectifying means, means synchronized by said transmitter for rendering said rectifying means inoperative for the portion of each reception interval after the transmission of each pulse from said transmitter during which echoes of appreciable amplitude are received by said receiver, and means for measuring the average output of said rectifying means during the remainder of each reception interval of said receiver, whereby the relative gain of said receiving means may be measured during the operation of said radio-object locating system.

4. A gain measuring apparatus according to claim 3, wherein said receiving means includes a plurality of receiver channels, and wherein the output from each of said receiver channels is selectively applied to said rectifying means, whereby the relative gain of said plurality of receiver channels with respect to each other can be determined.

RICHARD C. ALLEN.
JACOB MILLMAN.

References Cited in the file of this patent

UNITED STATES PATENTS

| Number | Name | Date |
|---|---|---|
| 2,207,267 | Plaistowe | July 9, 1940 |
| 2,333,688 | Shepard | Nov. 9, 1943 |
| 2,403,527 | Hershberger | July 9, 1946 |
| 2,419,606 | Stodola | Apr. 29, 1947 |
| 2,427,523 | Dolberg et al. | Sept. 16, 1947 |
| 2,446,244 | Richmond | Aug. 3, 1948 |
| 2,466,959 | Moore | Apr. 12, 1949 |

OTHER REFERENCES

Espenschied, "Methods of Measuring Interfering Noises," Proc. I. R. E., November 1931, 4 pages.